J. H. SANGERS.
BATTERY TAMPING MACHINE.
APPLICATION FILED JAN. 19, 1917.

1,285,301.

Patented Nov. 19, 1918.
7 SHEETS—SHEET 1.

Fig. 1

INVENTOR.
J. H. SANGERS
BY
ATTORNEY

J. H. SANGERS.
BATTERY TAMPING MACHINE.
APPLICATION FILED JAN. 19, 1917.

1,285,301.

Patented Nov. 19, 1918.
7 SHEETS—SHEET 2.

FIG. 2

INVENTOR.
J. H. SANGERS
BY
ATTORNEY

UNITED STATES PATENT OFFICE.

JOHN H. SANGERS, OF CLEVELAND, OHIO, ASSIGNOR, BY MESNE ASSIGNMENTS, TO NATIONAL CARBON COMPANY, INC., A CORPORATION OF NEW YORK.

BATTERY-TAMPING MACHINE.

1,285,301.

Specification of Letters Patent. Patented Nov. 19, 1918.

Application filed January 19, 1917. Serial No. 143,286.

*To all whom it may concern:*

Be it known that I, JOHN H. SANGERS, a citizen of the United States, residing at Cleveland, in the county of Cuyahoga and State of Ohio, have invented a certain new and useful Improvement in Battery-Tamping Machines, of which the following is a full, clear, and exact description.

This invention relates to improvements in tamping machines and more particularly to dry cell tamping apparatus, and while it is applicable to tamping apparatus generally, for purposes of illustration the improvement has been shown in connection with the type described in the patent to Richmond and Zellers, No. 641,546.

In the following specification certain details of the apparatus and its operation are similar to this patent, and will not be specifically described.

In tamping a dry cell the usual procedure is as follows: The operator places an electrode in the electrode holder and a can on the carriage, and then manually feeds the mix into the can, and it is then forced downward by the tamping sticks. The operator must observe when the cell is tamped to the proper height, and at this moment will push the can and carriage down by pressing upon the foot lever to raise a counterweight. When the carriage reaches the bottom the cell is removed and another can placed on the carriage. This will then be raised when the operator releases a clutch which brings the counterweight into action to raise the carriage.

One object of the present invention is to improve the foregoing apparatus by providing automatic arrangements for feeding the mix and mechanism for starting and stopping the said mix feeding at the proper times.

A second object of the invention is to provide an automatic quick drop for the carriage when the cell is tamped to the desired height, whereby the operator is not compelled to judge when the cell is sufficiently tamped. Inasmuch as the carriage is forced downward quite rapidly, it is a difficult matter to tamp the cells to approximately the same height and requires considerable practice on the part of the operators. Furthermore, to lower the can and carriage requires the operator to apply a very considerable force in order to offset the force of the counterweight which the tamper works against.

A further improvement consists in an arrangement which permits an operator to remove a tamped cell and place an empty cell on one carriage while a cell on an adjacent carriage is being tamped.

Further advantages will appear in the following description and drawings in which:—

Figure 1:
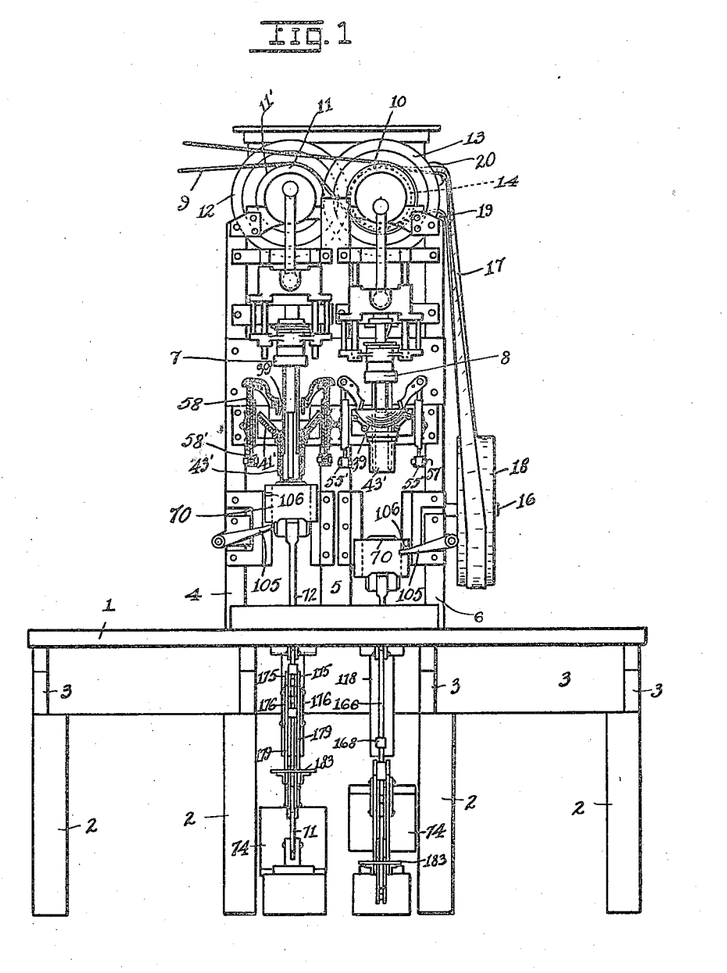
Figure 1 is a front view of the apparatus with one of the mix feeders in cross section.
Figure 2:
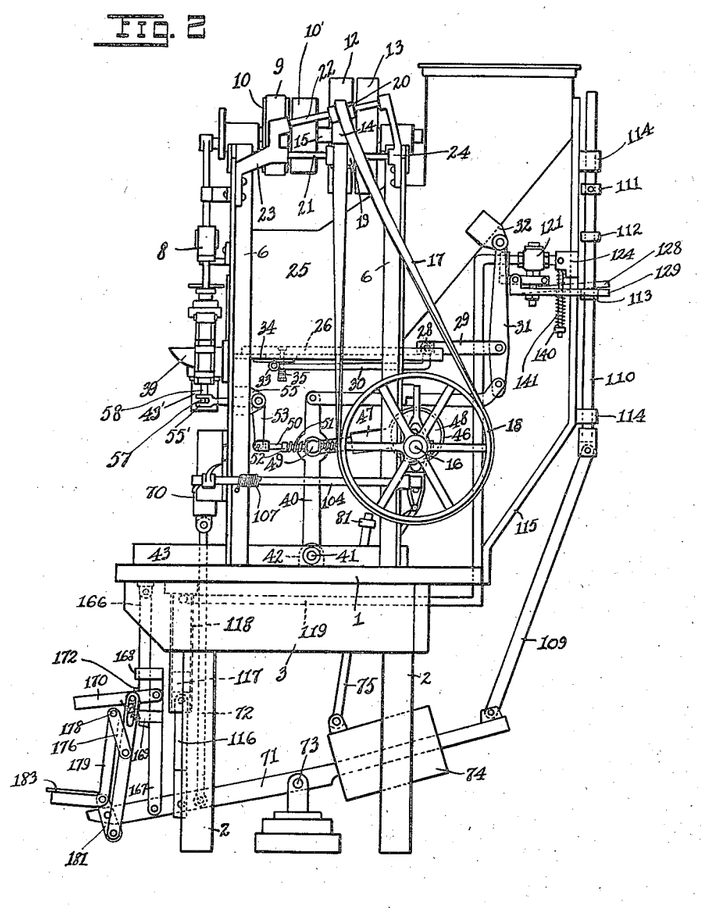
Fig. 2 is a side view showing the right-hand mechanism of Fig. 1.

As shown in Figs. 1 and 2, the framework of the apparatus consists of a bench 1 supported on a plurality of legs 2 which are suitably reinforced by side strips 3. The bench 1 has mounted thereon three pairs of uprights 4, 5 and 6 (Fig. 6), the two outer pairs being made of angle iron and the center pair being T's. Two tamping mechanisms 7 and 8 are mounted on these uprights and each consists of reciprocating rotating tamping sticks and an electrode holder together with supporting and operating mechanism which are similar to that of the Richmond and Zellers patent and need not be described in detail.

One tamping mechanism 7 is mounted between uprights 4 and 5 and the second mechanism 8 is mounted between uprights 5 and 6. The driving force consists of a belt 9 which passes around pulley 10 to operate tamper 8 and the under side of the belt runs over pulley 11 to drive tamper 7. Idle pulleys 10' and 11' are provided which operate in conjunction with the driving pulleys 10 and 11. 12 and 13 are fly wheels for tampers 7 and 8 respectively. A pulley 14 is mounted on shaft 15 which also carries pulleys 10, 10' and fly wheel 13. Shaft 16 is driven from shaft 15 by means of a belt 17 and pulley 18 for a purpose to be referred to later. Shafts 15 and 16 are at right angles to each other and to twist the belt in a way which will keep in on pulleys 14 and 18, two extra pulleys 19 and 20 are used. The former is mounted on shaft 21 which is parallel to shaft 15 and the latter is fitted on a shaft 22 in the same vertical plane as shaft 21 but inclined thereto. Suitable brackets 23 and 24 having bearings for shafts 21 and 22 are bolted to uprights 6, 6.

Figure 3:
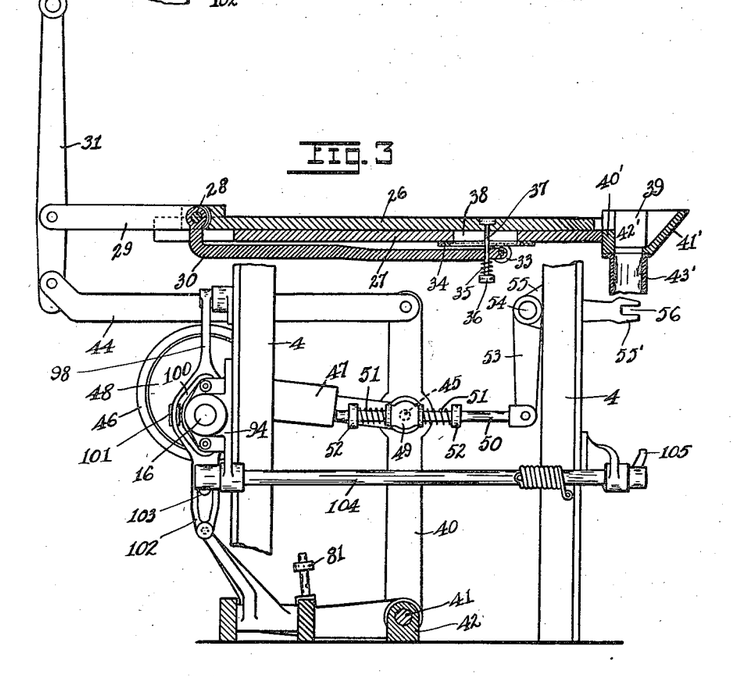
Fig. 3 is a detail view with certain parts in section illustrating the mix feed slide and the arrangements for starting and stopping it at the proper time.

Instead of feeding the mix by hand from a platform as in the patent referred to, it is automatically fed from a hopper 25 by means of slides 26, one being provided for each tamper 7 and 8. As shown in Figs. 2 and 3, the slide 26 fits into a groove in the bottom 27 of the hopper 25 and is connected by means of a pin 28 to a link 29 and an angular arm 30. Link 29 is pivotally connected to an arm 31 which reciprocates on a projection 32 fastened to the hopper. At the front end the arm 30 has a small wheel 33 which moves in grooves in a plate 34 fastened to the bottom of the hopper. The wheel is held against the bottom by means of a spring 35 which fits between the arm and the head 36 of a pin 37. The pin is fastened at one end to the slide and passes through a slot 38 in the bottom of the hopper. This arrangement holds the slide against the bottom of the hopper. The mix is fed into a guide 39 fastened to the hopper in front of an opening 39' through which the mix is pushed. This guide member has a vertical back 40', a curved front 41', and the sides 42' are inclined planes. A spout 43' is fastened to the bottom and has an internal diameter slightly larger than that of the dry cell can. The mix is fed from the hopper into the can which is fitted in the spout 43'.

Figure 4:
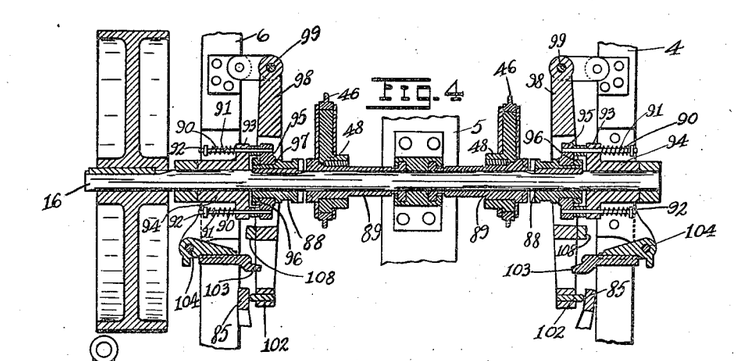
Fig. 4 is a cross section of the clutches controlling the mix feed of both the right and left hand mechanisms.
Figure 5:
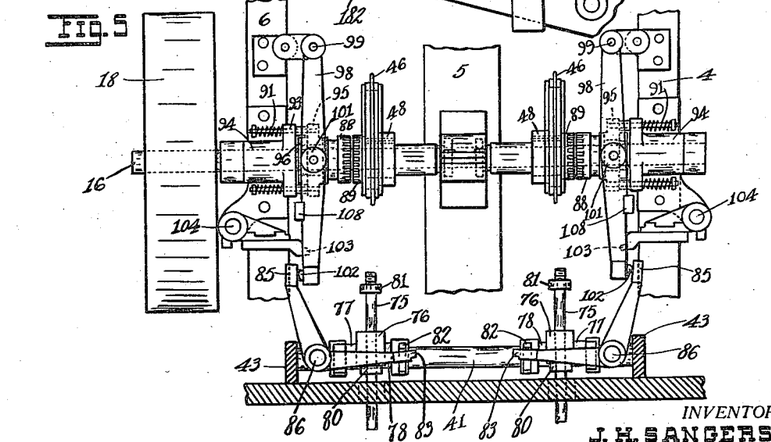
Fig. 5 is a detail view taken from the rear of Fig. 1, illustrating certain levers for operating the mix feed controlling clutches.
Figures 6, 7, 8, 9, 10:
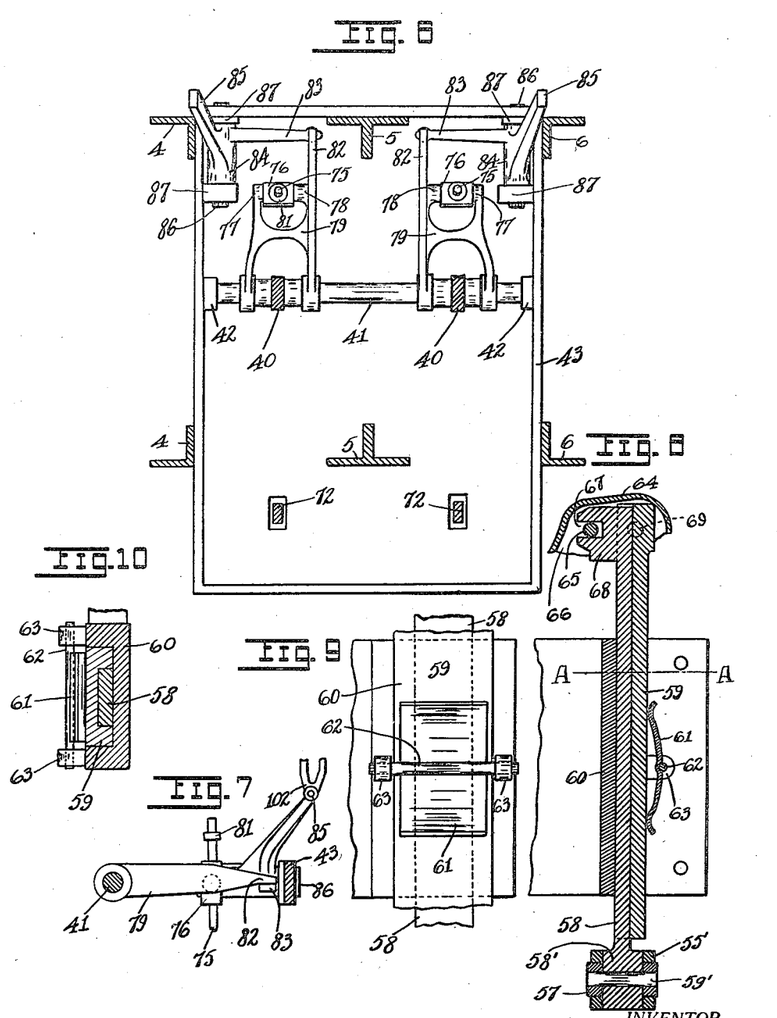
Fig. 6 is a detail plan view of the mix feed control levers and bearing frame.
Fig. 7 is a detail view of a portion of the mix feed levers taken from the center of Fig. 6 looking toward the left.
Fig. 8 is an enlarged cross section of the mechanism for operating the mix pushers.
Fig. 9 is a side view of the parts shown in Fig. 8.
Fig. 10 is a cross section on the line A—A of Fig. 8.
Figures 11, 13, 14:
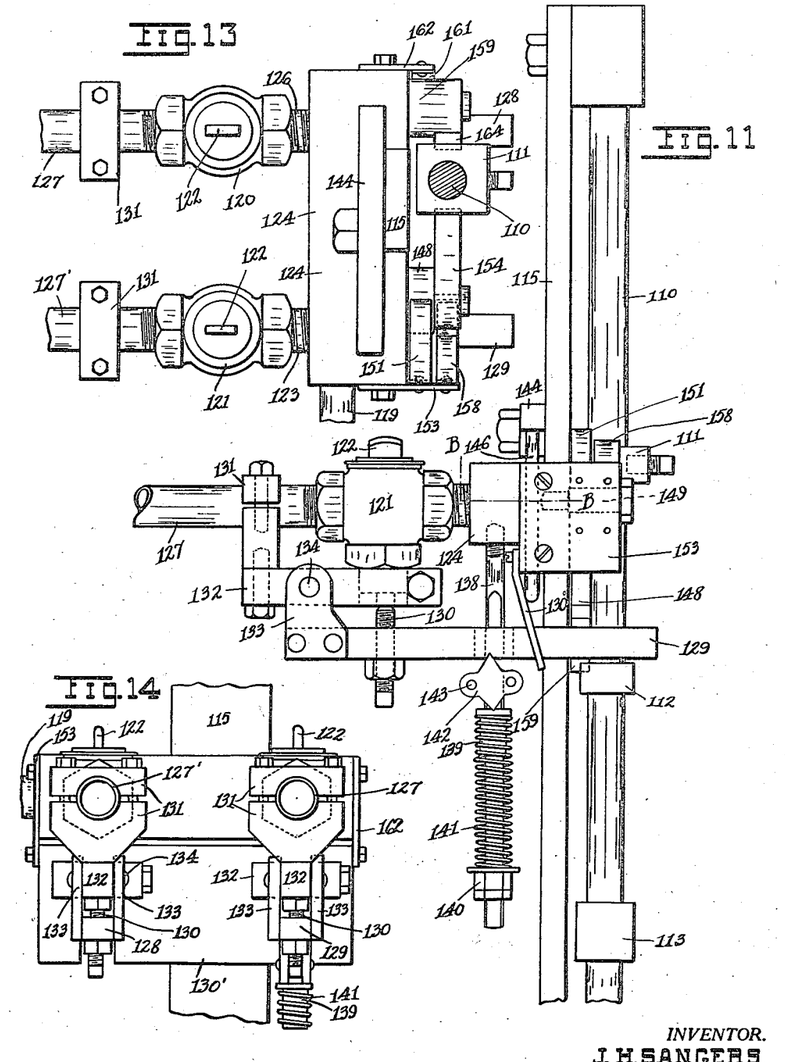
Fig. 11 is a side view of a portion of the pneumatic quick drop mechanism.
Fig. 13 is a top view of the same portion.
Fig. 14 is an end view.

The apparatus for operating the mix feed slide and the controlling clutches is shown in Figs. 2 to 7 and comprises a lever 40 oscillatory through a small angle on a shaft 41 fitted in bearings 42 of a frame 43 (Fig. 6). Levers 40 and 31 are connected together by means of a link 44. A rod 45 passes through lever 40 at a point intermediate to the ends and a crank arm 47 fastened to a circular ring 46 embraces the rod. Eccentric 48 keyed on shaft 16 rotates in the ring and imparts a reciprocating movement to the rod 45 and the slide 26 connected therewith by the link arrangement just described.

A device for pushing the mix out of the funnel 39 into the can is also operated from rod 45. A member 49 similar to a T pipe connection is fitted on each end of rod 45 and a rod 50 passes through the alined openings. A spring 51 is fitted between a stop 52 and each side of the T so that when rod 45 is moved back and forth, rod 50 is also moved back and forth, but the springs make a flexible connection and also permit adjustment to the desired stroke. Rod 50 is pivotally connected to one end of a bell crank lever 53 mounted at the center on a pin 54 which passes through a projection 55 bolted to one of the angular uprights. The free end 55 of the bell cranks has a vertical slot 55' and a horizontal slot 56 therein. A rectangular lug 57 (Fig. 1) having an opening therethrough, is fitted in each slot 56. A slide member 58 having a perforated lug 58' is connected between each pair of rectangular lugs by means of a pin 59' passing therethrough. As shown in Fig. 10, the guideways for slides 58 each consist of two oppositely placed channels, one 59 being fitted into an outer channel 60 which is fastened in a suitable manner to the uprights of the framework. The inner channel in each case is not rigidly fastened to the outer channel but is held from downward movement due to gravity, by means of a spring 61 which does not, however, prevent the inner channel from being moved when sufficient force is applied. This spring does not, however, prevent downward movement of the slide 58 which is controlled entirely by the movement of the bell crank 53. A suitable manner of mounting the spring consists in forcing it under a pin 62 passing through projections 63 on the outer channel 60.

As shown in Fig. 8, the upper ends of the slide 58 and channel 59 are connected to a mix pusher 64 by means of pins. A pin 65 passes through the sides 66 of the mix pusher and through a slot 67 cut in a projection 68 of the slide 58. The channel 59 is also connected to the sides of the mix pusher by means of two pins 69 each of which fits into one side of the channel and one side of the mix pusher. Although only a single mix pusher has been described, it will be evident from Fig. 1 that four are provided, two forcing the mix down from opposite sides of each guide in a manner to be described more fully later.

To start and stop the mix feed at the proper time a clutch arrangement shown in Figs. 1 to 7 is operated by means of mechanism connected with the can carriage 70. The details of the can carriage and slide are shown in the prior patent and need not be fully described herein. This carriage is connected to a counter-weight lever 71 (Figs. 12 and 17) by means of a rigid connecting link 72. The lever 71 is pivoted at 73 and carries a counter-weight 74 to which a pivoted rod 75 is fastened which operates the mix feed clutch.

The rod 75 passes through a block 76 (Figs. 5 and 6) pivoted between projections 77, 78 of a member 79. On each side of the block, stops 80, 81 are fastened to turn the member 79 through a small angle on the shaft 41 upon which it is mounted. The member 79 is thus raised and lowered so that the end 82 may act upon the horizontal arm 83 of a bell crank lever 84 having a vertical arm 85. The bell crank lever is mounted on a horizontal pin 86 inserted in bearings 87 projecting from the frame 43.

The downward movement of the rod 75 which corresponds with the upward movement of the carriage places a clutch into action to operate the mix feed. The clutch, shown especially in Figs. 4 and 5, is mounted on shaft 16 and consists of a portion 88 slidably keyed onto the shaft so that it always rotates therewith. The rotating clutch member 88 which has a plurality of alternate lugs and notches, is pushed into engagement with a sleeve 89 also having similar notches and lugs, against the action of two springs 90 which tend to keep the parts 88 and 89 apart. The springs are mounted on pins 91 which have a stop 92 at one end and pass through a collar 93 of the shaft bearing 94. The other end of the spring pins 91 is fitted into holes of a ring 95. Ring 95 has a sliding fit on the rotating clutch member 88 and is held thereon by a nut 96 which presses it against a collar 97. A clutch control lever 98 is pivoted at one end 99 to the frame and at the center has an opening 100 (Fig. 3) which surrounds the ring 95 with which it is connected by means of suitable pins 101. The free end 102 of the lever 98 contacts with the end 85 of the bell crank lever and controls the inward movement of the rotating clutch member 88.

The operation of the clutch is also dependent on the position of a locking member 103 fitted on a shaft 104 carried in suitable projections from the frame. At the other end of shaft 104 a projecting arm 105 (Fig. 1) is adapted to be engaged by a projection 106 of the can carriage just before the can is filled with mix to the proper height. A spring 107 (Fig. 2) wound around the shaft and fastened at one end to the frame and at the other end to the shaft, tends to keep both the arm 105 and the locking member 103 in a raised position except when the projection 106 is in contact with arm 105. When the locking member 103 is in a raised position it engages a lug 108 of the clutch control lever and keeps the clutch in engagement regardless of the position of the bell crank lever 85. The manner in which these two clutch control features coöperate while tamping a cell will be more fully described later.

After the mix is tamped to the proper height, mechanism for forcing the carriage down quickly is placed into operation. As shown in Fig. 2 an extension of the counter-weight lever 71 is pivotally connected by means of a link 109 to an operating rod 110 having three stops 111, 112 and 113 adjustably fastened thereto. The operating rod is supported in a vertical position by means of bearings 114 attached to a strip 115 bolted between hopper 25 and platform 1.

Referring to Fig. 2 and Figs. 11 to 16, the front end of the counterweight lever 71 is pivoted to a connecting rod 116 of piston 117. A cylinder 118 for piston 117 has a pipe 119 serving as both inlet and exhaust for compressed air which is admitted to the cylinder to force the carriage down. The air is controlled by means of two "pop" valves of well known construction, one of which 120 controls the exhaust and the other 121 controls the admission of air. These valves are opened by raising the stems 122, and close automatically due to an internal spring when the stems are released. One side of intake valve 121 is connected to a source of air pressure and the other end is connected by means of a pipe nipple 123 with a casting 124 having a passage 125 (Fig. 15) therein. The two sides of the exhaust valve 120 are respectively open to the atmosphere through pipe 127 and connected to passage 125 by means of a nipple 126. Pipe 119 leading to the cylinder 118 is connected to passage 125.

Controlling levers 128 and 129 for valves 120 and 121 are guided by a plate 130′. Adjustable pins 130 are threaded through the levers and adapted to engage projections of the valve stems 122. The controlling levers 128, 129 are mounted on pipes 127 and inlet 127′ respectively, by means of clamps 131 bolted to the pipes. At the bottom of these clamps brackets 132 are fastened which act as hangers for supporting lugs 133 fitted on each side of the hangers, and are pivoted thereto by means of pins 134.

A rod 135 (Fig. 16) is threaded into a hole in the bottom of casting 124 and passes through a slot in lever 128. Between the casting 124 and the lever 128 a spring 136 is placed and a nut 137 is then threaded onto rod 135 to compress the spring which thus acts to push the lever downward.

A second rod 138 is threaded into a hole in casting 124 and passes through lever 129. Between stops 139 and nut 140 a spring 141 is placed which tends to raise the lever 129. Two pointed lugs 142 (Figs. 11 and 12) connected by pins 143 are fitted on a flattened portion of the rod 138 and the points fit in slots in the lever and in stop 139 so that the lugs act as intermediate members to transmit pressure tending to raise the lever 129.

Figures 12, 15, 16:
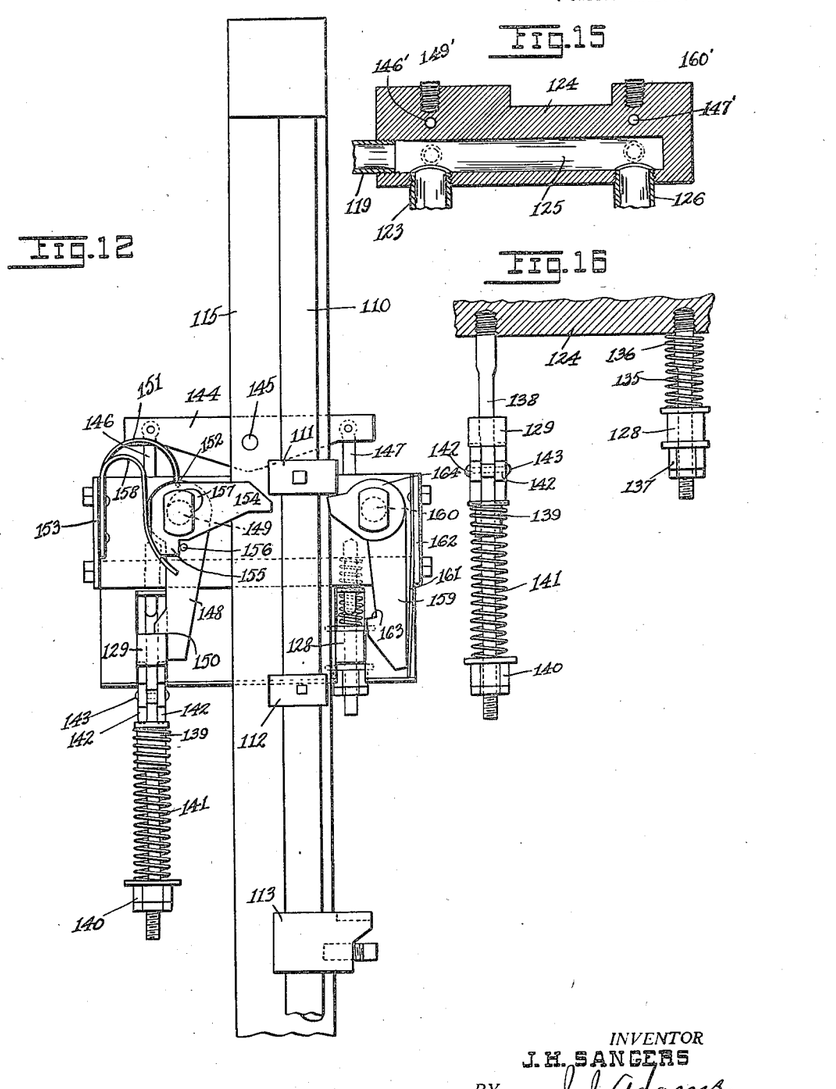
Fig. 12 is a view of the parts shown in Fig. 11 taken from the rear of the apparatus.
Fig. 15 is a cross section of a portion of the quick drop mechanism taken on the line B—B of Fig. 11.
Fig. 16 is a detail fragmentary view illustrating the relation of the valve control arms and the operating springs.

In order to lower lever 129 when lever 128 is raised, or in other words, to close the intake when the exhaust is open, the movements of the two are made dependent on each other by means of a cross bar 144 pivoted at 145 to the supporting member 115. The cross bar 144 carries two suspended pins 146, 147 which pass through holes 146', 147' in the casting 124 (Fig. 15).

Lever 129 (Fig. 12) will be held at certain times in a horizontal or closed position by means of a catch 148 pivoted on a pin 149 which threads into a hole 149' in casting 124. At the bottom the catch has a rectangular notch 150 for receiving the lever 129 and on the top one end of a flat spring 151 fits in a notch 152. The other end of the spring is fastened to a plate 153 which is in turn bolted to the hollow casting 124. The flat spring will tend to rotate the lever in a clockwise direction. Means for releasing the lever 148 consists of a second lever 154 which has a projection 155 adapted to engage a pin 156 projecting from the lever 148. The arm 154 which is adapted to be engaged by stop 112 has a hole 157 through which screw 149 passes. A spring 158 attached at one end to plate 153 engages projection 155 and tends to hold the arm in a horizontal position with pin 156 adjacent projection 155.

Lever 128 is adapted to be held in a raised position by means of a catch 159 rotatable on a pin 160 which threads into opening 160' in the casting 124. A spring 161 fastened to a plate 162 is adapted to press the lever 159 in a clockwise direction so that the notch 163 engages the lower surface of the lever 128 to hold it in a raised position. A projecting lug 164 integral with lever 159 lies in the path of stop 111 and is adapted to be engaged by said stop to release catch 159. Stop 113 projects from rod 110 a sufficient distance to strike arm 128.

Figure 17:
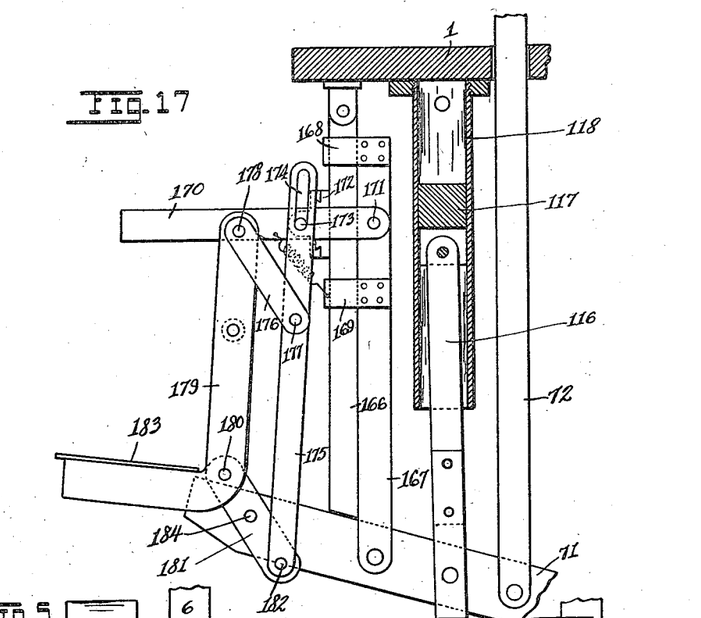
Fig. 17 is a view with certain parts in cross section, of the foot pedal and associated levers.

In Figs. 2 and 17 a friction clutch released by foot pressure is shown in the positions corresponding with the lowered and the raised positions of the carriage. The clutch consists of an arm 166 pivotally suspended from the platform 1 which coöperates with an upwardly extending arm 167 pivoted at the bottom to the counterweight lever 71. The arm 167 has straps 168, 169 fastened thereto inclosing the arm 166. A forked member 170 is pivoted at 171 to arm 167 and is drawn downward by means of spring 170'. A friction contact slide 172 fitted on a pin 173 is mounted on the prongs of the fork. Pin 173 also passes through slots 174 of connecting links 175 placed on each side of the fork and connected to the fork and counterweight lever in the following manner: A link 176 is placed on the outside of each link 175 and a single pin 177 passes through all four links. One link 176 is connected at the other end by means of a pin 178 with an L-shaped member 179. The other link 176 is likewise connected by another pin 178 to another L-shaped member. Each L-shaped member is connected by a pin 180 with a link 181 pivoted at an intermediate point 184 to the counterweight lever and connected at the other end to links 175 by pins 182. A plate 183 is placed across the L-shaped members to form a foot platform.

In the preceding description one side of the apparatus has been described, although it will be evident from the drawings that the parts on the left of one side are on the right of the other. It will be noted also that shaft 16 extends across the rear of the entire apparatus.

Starting with the apparatus in the position shown in Fig. 1 in which the lefthand carriage is raised to its highest position and a can is in place, the operation consists of two parts, one for each side of the apparatus, performed simultaneously. The two are exactly the same but the steps are preferably in opposite phases so that the manual operations are alternately performed on each side.

Referring particularly to the righthand side, the operator will place a can on the carriage which is held in the lowermost position by means of the clutch links which occupy the relative positions shown in Fig. 2. The forked member, it will be noted, takes a position inclined to the suspended arm 166 so that pin 173 is closer to arm 166 so that the friction slide 172 is pressed against it by means of a downward acting spring, and is in turn pressed against upwardly extending arm 167. The tendency of the counterweight 74 to raise the arm 167 and carriage 70 simply tends to tighten the clutch because raising pin 171 shortens the perpendicular distance of pin 173 from the upwardly extending arm 167. The clutch acts in a similar manner in all positions as the carriage is descending to prevent it from being raised due to the counterweight, unless the clutch is released. When the can is in place and an electrode has been placed in the retaining clips of the tamper, the carriage will be raised by pressing on foot lever 183, causing the links to assume the position shown in Fig. 17 or some position more or less intermediate to these two positions illustrated, whereby the clutch is released. The counterweight then raises the connecting links and piston to the positions shown in Fig. 17 and the carriage and can to a position corresponding with that of the lefthand mechanism of Fig. 1.

As the carriage ascends the following actions will take place: The lug 106 (Fig. 1) of the carriage as it comes up will allow spring 107 (Fig. 2) to raise arm 105 and catch 103. Simultaneously stop 81 on rod 75 will be lowered as the carriage rises because it is on the opposite side of the pivot point of the counterweight lever. If the arm 79 has been held due to friction, the stop will engage the block 76 and pull the lever 79 down so that the end 82 engages the arm 83 of the bell crank 84. The end 85 of the bell crank is then forced inward and carries the clutch lever 98 with it. When the clutch lever 98 is pushed in, the notch of catch 103 engages the projection 108 and holds the lever in, even when the direction of movement of rod 75 is reversed during tamping. The movement of lever 98 carries the rotating notched member 88 into engagement with the corresponding stationary member 89. When the two parts of the clutch are in engagement the eccentric which is keyed to the sleeve 89 will be rotated, producing a reciprocating movement of the rod 45 which is connected to the eccentric by the ring 46 and crank 47 as described. A rocking movement is thus imparted to slide 26 which pushes mix into the inclined hopper 39.

The movement of shaft 45 also operates the mix pushers 64 which slide on the bottom of the hopper. Bell crank 53 is turned through a certain angle thus raising and lowering the lugs 57 which slide in the slot 56. Slide 58 and pin 65 will evidently be raised and lowered an amount corresponding with the vertical movement of the ends 55 of the bell crank 53. The movement of the mix pushers, however, is also dependent on the movement of the pins 69. On the first part of the up stroke of slide 58, the pin 65 will be raised until member 58 strikes the top of the pusher 64, the channel 59 and pins 69 meanwhile remaining stationary so that the rotation of pin 65 around pin 69 raises the front or mix engaging end of the pushers. The channel 59 is held against the outer channel 60 by the spring 61. During the remainder of the up stroke both pins 65 and 69 are raised so that the entire pusher is also raised. The force of spring 61 is not sufficient to prevent the channel 59 from being raised by the positive force applied. On the first part of the down stroke the pins 69 and channel 59 are held stationary by the spring force while pin 65, member 58 and the front end of the mix pusher drop until the front end engages the bottom of the hopper when both the channel 59 and pin 69 are thus forced to descend with the member 58. The mix pusher is thus held firmly against the sloping sides and remains in the same position during most of the down stroke. The mix feed slide and pushers are thus set in operation.

The raising of the carriage produces a downward movement of rod 110 and the three stops 111, 112 and 113 affixed thereto. At the beginning of this movement stop 113 occupies the position indicated in Fig. 2, adjacent the lever 128 which is raised, and the exhaust valve 120 is open. The cross arm 144 will be inclined downward toward the left and the intake valve 121 will be closed. As the rod 110 and stop 113 descend the arm 128 also drops, but before taking a position which closes the exhaust valve the movement of the arm is arrested by the spring pressed catch 159 which has a suitable notch for engaging the arm 128.

Stop 112 passes lug 164 without engaging it because it does not project sufficiently in this direction. When stop 112 engages the lug 154 on the downward stroke it simply compresses spring 158 without changing the valves or lever 129. When the carriage reaches the uppermost position, stop 111 comes into contact with lug 164 and turns lever 159 so that valve control arm 129 is released and forced down by the action of spring 136. The cross arm 144 assumes a horizontal position as do the valve control arms 128 and 129. Both valves are then closed.

During this period in which the righthand carriage is being raised, the lefthand carriage and a cell are being tamped. The cell is now ready to be tamped on the righthand side. The tamping or downward movement of the carriage and the operations occurring simultaneously therewith are as follows, reference being had by way of example, to the righthand side which is the side completely illustrated.

As mix is fed into the can by the reciprocating action of slide 26 and mix pushes 64, it is compressed by the tamping sticks. The can and carriage are gradually forced downward against the force of the counterweight. When the tamping sticks are on the up stroke the carriage is prevented from rising by the action of the friction clutch previously described.

A slight vacuum is formed in cylinder 118 as the piston 117 descends because both intake and exhaust valves are closed. This only produces a slight additional force for the tamper to overcome and does not affect the operation otherwise.

When the carriage reaches the point where lug 106 engages 105 and depresses arm 103 so that it is out of engagement with projection 108, then the clutch parts will be separated by the action of springs 91 which draw the member 88 and clutch lever from the sleeve 89. Bell crank arm 84 is not held against end 102 with sufficient force to hold the clutch arm in engagement against the action of springs 91. This may be done because the upward movement of stop 81 allows the arms 82 and 83 to be raised. As soon as the clutch is thrown out the mix feed stops although the tamping continues for a short time thereafter to completely compact the top portions of the mix.

When the mix is thus tamped to the required height the carriage is rapidly lowered by the pneumatic arrangement.

At the point at which the quick drop should start, stop 112, which is moving upward, strikes arm 154 and raises it against the action of spring 151, the pin 149 moving in slot 157. The lower projection 155 engages pin 156 and turns lever 148 so that the notch 150 is moved out of engagement with arm 129. The force of spring 141 raises this quickly and opens the intake valve 121 which is connected with some source of air pressure. Air then passes into cylinder 118 to apply a pressure sufficient to overcome the counterweight and force the carriage rapidly downward. This takes only a very short time and when the carriage reaches the bottom of the stroke the air pressure valve 121 is closed and exhaust 122 is opened by stop 113 striking arm 128 and raising it to open exhaust valve 121. The action of cross arm 144 and pins 146 and 148 simultaneously closes the intake valve 122. The tamped cell is then removed and another can placed on the carriage.

By means of the apparatus just described one operator is able to tamp two cells in practically the same time previously taken for tamping a single cell. This is made possible by relieving him of the task of observing when a cell is tamped to the proper height. The use of air pressure for forcing the carriage down after the cell is tamped also relieves the operator of the burden of applying a very considerable foot pressure to accomplish this result.

The automatic mix feed also relieves the operator of a very considerable part of the labor of tamping dry cells, and permits more uniform tamping of the mix therein.

Another improvement resides in the foot pedal release of the friction clutch which does not require the operator to bend down and grasp the forked member to raise it in order to release the friction clutch as in the prior patent.

Having described my invention, what I claim is:

1. In dry cell tampers, a can carriage, means for tamping the mix in the can, a counterweight adapted to permit yieldingly resisting movement between said carriage and tamping means as the mix is tamped in the can, a clutch adapted to prevent the can carriage and tamping means from approaching each other, and means adapted to overcome said counterweight when the mix reaches a predetermined height in the can whereby the carriage is automatically withdrawn.

2. In dry cell tampers, a movable can carriage, means for tamping the mix in the can, a counterweight for yieldingly resisting downward movement of said carriage as the mix is tamped in the can, a clutch adapted to prevent upward movement of the carriage, and means adapted to overcome said counterweight when the mix reaches a predetermined height in the can whereby the carriage is automatically withdrawn.

3. In dry cell tampers, a movable can carriage, means for tamping the mix in the can, a pivoted counterweight for yieldingly resisting downward movement of said carriage as the mix is tamped in the can, a clutch adapted to prevent upward movement of the carriage, a piston connected to the carriage and means for applying pressure to the piston to overcome said counterweight when the mix reaches a predetermined height.

4. In dry cell tampers, a movable can carriage, means for tamping the mix in the can, a pivoted arm connected to the carriage on one side of the pivot point of said arm, means for yieldingly resisting downward movement of said carriage acting on the other side of the pivot point of the arm, and means for overcoming said yielding pressure when the mix reaches a predetermined height in the can whereby it is automatically withdrawn.

5. In dry cell tampers, a movable can carriage, means for tamping the mix in the can, a pivoted arm connected on one side of the pivot point to said carriage, a counterweight for applying a yielding pressure connected on the other side of the pivot point of the arm, a piston connected to the carriage and means for applying pressure to said piston to overcome the force of the counterweight when the can is tamped to a predetermined height, whereby the can is automatically withdrawn.

6. In dry cell tampers, a movable can carriage, means for tamping the mix in the can, a pivoted arm connected on one side of the pivot point to said carriage, means for applying a yielding pressure adapted to resist downward movement of the carriage, means for preventing upward movement of the carriage due to said pressure and means for overcoming said pressure when the mix reaches a predetermined height in the can whereby the can is automatically withdrawn.

7. In dry cell tampers, a movable can carriage, means for tamping the mix in the can, a pivoted arm connected on one side of the pivot point to said carriage, means for applying a yielding pressure on the other side of the pivot point of the arm, a piston connected to said carriage, a valve adapted to admit pressure to said piston, and means dependent on the position of the carriage for opening the valve when the mix reaches a predetermined height in the can whereby the carriage is automatically withdrawn.

8. In dry cell tampers, a movable can carriage, means for tamping the mix in the can, a pivoted arm connected on one side of the pivot point to said carriage, a counterweight for applying a yielding pressure on the other side of the pivot point of the arm, a clutch adapted to prevent upward movement of the carriage, a piston connected to the carriage, a source of pressure adapted to be applied to the piston, a valve between the source of pressure and the piston, and means dependent on the position of the carriage adapted to open the valve when the mix reaches a predetermined height in the can whereby the carriage is automatically withdrawn.

9. In dry cell tampers, a movable can carriage, means for tamping the mix in the can, a pivoted arm connected on one side of the pivot point to said carriage, means for applying a yielding pressure on the other side of the pivot point of the arm, a clutch adapted to prevent upward movement of the carriage, a piston connected to the carriage, a source of pressure adapted to be applied to the piston, a pressure inlet controlling valve, a stop adapted to move as said carriage moves, and means adapted to be engaged by said stop to open the inlet valve to apply pressure to the piston when the mix reaches a predetermined height in the can whereby the carriage is automatically withdrawn.

10. In dry cell tampers, a movable can carriage, means for tamping the mix in the can, a pivoted arm connected on one side of the pivot point to said carriage, means for applying a yielding pressure on the other side of the pivot point of said arm, a piston connected to the carriage, a source of pressure adapted to be applied to the piston, a valve between the source of pressure and the piston, a rod connected to the pivoted arm, a stop thereon, and means adapted to be engaged by said stop to open the inlet valve to apply pressure to the piston when the mix reaches a predetermined height in the can whereby the carriage is automatically withdrawn, and means for closing said inlet valve when the carriage reaches the end of the stroke.

11. In dry cell tampers, a movable can carriage, means for tamping the mix in the can, a pivoted arm connected on one side of the pivot point to said carriage, means for applying a yielding pressure on the other side of the pivot point of the arm, a piston connected to said carriage, a source of pressure adapted to be applied to the piston, an inlet valve between the source of pressure and the piston, a rod connected to the pivoted arm, a stop thereon, means adapted to be engaged by said stop to open the inlet valve to apply pressure to the piston when the mix reaches a predetermined height in the can whereby the carriage is automatically withdrawn, means for closing said inlet valve when the carriage reaches the end of the stroke, an exhaust valve connected to the piston and means adapted to open said exhaust valve when the carriage reaches the bottom of the stroke.

12. In dry cell tampers, a movable can carriage, means for tamping the mix in the can, a pivoted arm connected on one side of the pivot point to said carriage, means for applying a yielding pressure on the other side of the pivot point of the arm, a clutch adapted to prevent upward movement of the carriage, a piston connected to the carriage, a source of pressure adapted to be applied to the piston, an inlet valve and an exhaust valve, means dependent on the position of the carriage adapted to open the inlet valve and close the exhaust valve when the cell is tamped to the proper height, and means for closing the inlet valve and opening the exhaust valve when the carriage is at the bottom of the stroke.

13. In dry cell tampers, a movable can carriage, means for tamping the mix into the can, a pivoted arm connected on one side of the pivot point to the can carriage, means for applying a yielding pressure on the other side of the pivot point of the arm, a clutch adapted to prevent upward movement of the carriage, a piston connected to the carriage, a source of pressure adapted to be applied to the piston, an inlet and an exhaust valve, means dependent on the position of the carriage adapted to open the inlet valve and close the exhaust valve when the mix is tamped to the proper height, means for releasing the friction clutch when the cell is tamped whereby the carriage may be raised by the counterweight and means for closing the inlet valve and opening the exhaust valve when the carriage is at the bottom of the stroke whereby it may be raised by the yielding pressure.

14. In dry cell tamping apparatus, a movable can carriage, a pivoted arm connected on one side of the pivot point to the carriage, a counterweight on the other side of the pivot point, a suspended bar and an upwardly projecting bar connected to the pivoted arm, means adapted to press the bars together when the side of the pivoted arm connected to the carriage moves upward and to separate the bars when it moves downward, and a foot lever pivoted on said arm adapted to separate the clutch bars without raising the counterweight.

15. In dry cell tampers, a movable can carriage, a pivoted arm connected on one side of the pivot point to the carriage, a suspended bar, an upwardly projecting bar connected to the pivoted arm, a lever adapted to press the bars together when the side of the pivoted arm connected to the carriage moves upward and to separate the bars when it moves downward, a link pivoted at its center point to the pivoted arm, a foot lever connected at one end to the link and adapted to rotate it, and a lever connected at the other end of the link adapted to separate the bars when the foot pedal is depressed.

16. In dry cell tampers, a pair of movable can carriages, means for tamping the mix into the cans, means for yieldingly resisting downward movement of the carriages as the mix is tamped into the cans, means for feeding the mix into the cans and means for lowering the cans when the mix is tamped to a predetermined height in the cans.

17. In dry cell tampers, a pair of adjacent movable can carriages, means for tamping the mix into the cans, means for yieldingly resisting downward movement of the carriages as the mix is tamped into the cans, separate means for feeding the mix into the cans, means for stopping the mix feed to a can when the can is filled to the required height, means for lowering the can when the mix is tamped to a predetermined height in the cans and a pair of clutches adapted to prevent upward movement of the carriages.

18. In dry cell tampers, a pair of adjacent movable can carriages, means for tamping the mix into the cans, means for yieldingly resisting downward movement of the carriages as the mix is tamped into the cans, separate means for feeding the mix into the cans, means for stopping the mix feed to a can when the can is filled to the required height, means for lowering the can when the mix is tamped to a predetermined height in the cans, a pair of clutches adapted to prevent upward movement of the carriages and a pair of foot pedals adapted to release the clutches.

19. In apparatus for tamping dry cells, a movable can carriage and means for tamping the mix in the can, means for feeding the mix thereto, means for yieldingly resisting downward movement of the carriage and a second can carriage adjacent the first adapted to receive a can while mix is being tamped into the first cell.

20. In dry cell tamping apparatus, a pair of movable carriages, means for tamping mix into the cans, and means for feeding mix into a can on one carriage whereby an operator may place a can on the other while the first is being tamped.

21. In dry cell tampers, a movable can carriage, means for tamping the mix into the can, a mix hopper, a guide connecting the hopper with the top of the can, means for feeding the mix into the guide, an arm slidable on said guide adapted to engage the mix therein, and means for reciprocating the arm in the guide to force the mix into the can.

22. In dry cell tampers, a movable can carriage, means for tamping mix into the can, a mix hopper, a guide connecting the hopper with the top of the can, a slide for feeding the mix into the guide, a pair of oppositely disposed arms and means for reciprocating said arms in the guide to force the mix into the can.

23. In dry cell tampers, a movable can carriage, a hopper, a guide for feeding mix into the cans having an opening, means for tamping the mix into the can operating through said opening, a reciprocating slide for feeding mix from the hopper into the guide and a pair of oppositely disposed reciprocating arms for pushing mix toward the opening.

24. In dry cell tampers, a movable can carriage, a hopper, a guide having sloping sides and an opening for feeding mix into the cans, means for tamping the mix into the can operating through said opening, a reciprocating slide for feeding mix into the guide, a pair of oppositely disposed reciprocating arms for pushing mix toward the opening and means for pressing said arms against the inclined sides when moving downward toward the opening and raising them when moving upward and away from the opening.

25. In dry cell tampers, a movable can carriage, a hopper, a guide having sloping sides and an opening for feeding mix into the cans, means for tamping the mix into the can operating through said opening, means for feeding mix to the guide, a pair of oppositely disposed arms operating on the sloping sides engaging the mix, means for reciprocating the arms up and down on the inclined surfaces and means for rotating the mix engaging ends of the arms whereby the arms slide on the sloping sides throughout the downward movement.

26. In dry cell tamping apparatus, a movable can carriage, a mix hopper, a guide having inclined sides, a reciprocating slide for feeding mix from the hopper to the guide, a pair of mix pushers adapted to slide on the inclined surfaces of the guide, a reciprocating arm connected to each pusher, a guideway for said arms, a bar pivoted to each pusher and means for yieldingly pressing the bars against the guideways.

27. In dry cell tamping apparatus, a movable can carriage, a mix hopper, a guide, a reciprocating slide for feeding mix from the hopper to the guide, means for stopping the mix feed when the carriage is lowered to a certain height, and means for withdrawing the carriage when the mix is tamped to a certain height, said last mentioned means operating after said means for stopping the mix feed.

28. In dry cell tamping apparatus, a movable can carriage, means for feeding mix to a can, means for tamping mix into the can, means for yieldingly resisting movement of said carriage as the mix is tamped in the can, a clutch for controlling the mix feed, an arm for operating the clutch and a lug on the carriage adapted to engage the arm to throw said clutch and stop the mix feed.

29. In dry cell tamping apparatus, a movable can carriage, means for tamping mix into the can, means for yieldingly resisting movement of said carriage, means for feeding mix to the can, a clutch controlling said mix feeding means, and means for operating the clutch to start the mix feed when the carriage is in a raised position.

In testimony whereof, I hereunto affix my signature.

JOHN H. SANGERS.